US006678366B1

(12) United States Patent
Burger et al.

(10) Patent No.: US 6,678,366 B1
(45) Date of Patent: *Jan. 13, 2004

(54) SYSTEM AND METHOD FOR LOCATING SUBSCRIBERS USING A BEST GUESS LOCATION ALGORITHM

(75) Inventors: Eric William Burger, McLean, VA (US); John Kimball, Gaithersburg, MD (US); Walter Joseph O'Connor, Springfield, VA (US); Nancy Margaret Taylor, Bethesda, MD (US); Sanjiv Parikh, Fremont, CA (US); Christina Pax, Emmittsburg, MD (US)

(73) Assignee: Ulysses ESD, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/501,105

(22) Filed: Feb. 9, 2000

Related U.S. Application Data

(63) Continuation-in-part of application No. 09/387,228, filed on Aug. 31, 1999.

(51) Int. Cl.[7] .................................................. H04M 3/42
(52) U.S. Cl. ............................. 379/211.03; 379/201.06; 379/201.07; 379/201.1; 379/207.12
(58) Field of Search ............................. 379/38, 207.03, 379/211.01, 211.03, 221.01, 221.05, 221.06, 201.06, 201.07, 207.12

(56) References Cited

U.S. PATENT DOCUMENTS 4,313,035 A * 1/1982 Jordan et al. .......... 379/211.02
4,991,204 A * 2/1991 Yamamoto et al. .... 379/221.01
5,206,901 A 4/1993 Harlow et al.
5,243,645 A * 9/1993 Bissell et al. .......... 379/211.02
5,329,578 A 7/1994 Brennan et al.
5,548,637 A * 8/1996 Heller et al. ........... 379/201.07
5,550,907 A * 8/1996 Carlsen ................. 379/211.02
5,579,375 A * 11/1996 Ginter ......................... 455/417
5,652,789 A * 7/1997 Miner et al. ........... 379/201.01
5,659,596 A * 8/1997 Dunn ...................... 455/456.1
5,724,411 A * 3/1998 Eisdorfer et al. ........ 379/93.23
5,793,859 A 8/1998 Matthews
5,862,209 A 1/1999 Kapsales
5,896,448 A 4/1999 Holt
5,905,789 A * 5/1999 Will ...................... 379/211.03
6,021,190 A 2/2000 Fuller et al. ........... 379/212.01
6,104,799 A * 8/2000 Jain et al. .............. 379/211.01
6,104,801 A 8/2000 Miloslavsky
6,125,176 A * 9/2000 Foladare et al. ....... 379/211.02
6,130,938 A 10/2000 Erb
6,198,930 B1 * 3/2001 Schipper ..................... 455/440
6,320,943 B1 * 11/2001 Borland ................. 379/112.01
6,330,322 B1 * 12/2001 Foladare et al. ....... 379/211.01

FOREIGN PATENT DOCUMENTS

WO PCT/US01/04018 4/2001

* cited by examiner

*Primary Examiner*—Ahmad F. Matar
*Assistant Examiner*—Bing Bui
(74) *Attorney, Agent, or Firm*—Pennie & Edmonds LLP

(57) ABSTRACT

A system and method for locating the subscriber of a telephony product in which a best guess location is assigned to each subscriber of the telephony product. Under certain predetermined conditions, the telephony product directs incoming phone calls to a subscriber by first attempting to locate the subscriber at the best guess location. If the best guess location does not successfully answer or is not attempted first, an alternate search method is used.

45 Claims, 8 Drawing Sheets

Subscriber Database
200

202

| Subscriber 1 |
| Subscriber 2 |
| Subscriber 3 |
| ⋮ |
| Subscriber N |

Global Option Database
210

212

| Global Option 1 |
| Global Option 2 |
| Global Option 3 |
| ⋮ |
| Global Option N |

History Database
320

312 324

| Subscriber Telephone No. | Time Interval / Weight Set 1 | Time Interval / Weight Set 2 | • • • | Time Interval / Weight Set N |
|---|---|---|---|---|
| Telephone No. 1 | Weight 1.1 | Weight 1.2 | • • • | Weight 1.N |
| Telephone No. 2 | Weight 2.1 | Weight 2.2 | • • • | Weight 2.N |
| ⋮ | ⋮ | ⋮ | ⋮ | ⋮ |
| Telephone No. N | Weight N.1 | Weight N.2 | • • • | Weight N.N |

FIG. 3C

Caller Based
Instruction Set Database
340

342 344

| | |
|---|---|
| Caller ID 1 | Instruction Set 1 |
| Caller ID 2 | Instruction Set 2 |
| Caller ID 3 | Instruction Set 3 |
| ⋮ | ⋮ |
| Caller ID N | Instruction Set N |

FIG. 3D

Subscriber Specified
Parameter Database

| E-mail address |
| --- |
| Parallel Outbound Call Options |
| • • • |
| Subscriber specified paramater N |

SYSTEM AND METHOD FOR LOCATING SUBSCRIBERS USING A BEST GUESS LOCATION ALGORITHM

This application is a continuation-in-part of U.S. patent application Ser. No. 09/387,228, filed Aug. 31, 1999.

The present invention relates generally to voice call processing methods, and particularly to a method and apparatus for directing a phone call to a subscriber of an enhanced telephony product.

BACKGROUND OF THE INVENTION

Recent technological advances have led to the dramatic decrease in the cost of telephony products such as mobile phones and pager services. As a result, the number of telephone numbers at which a particular individual may potentially be reached is rapidly increasing. For example, a typical individual may have a home phone number, several work phone numbers, a pager number, an answering service, voice mail and one or more mobile telephone numbers. While this multitude of telephony products is very convenient to the particular individual, it is often inconvenient for others to reach the individual because of the large number of possible phone numbers at which the individual might be reached.

To address this problem, many enhanced telephony services have been devised. Central to these enhanced telephony services is the concept of assigning a unique telephone number to each service subscriber. People wishing to contact the subscriber call the subscriber's unique telephone number. Upon receiving a telephone call at the unique telephone number, the enhanced telephony service calls the numbers where the subscriber could potentially be located. If the enhanced telephony service is successful in locating the subscriber, the service directs the telephone call to the telephone number where the subscriber is located. To illustrate, a person ("caller") who wishes to contact a particular subscriber will telephone the subscriber's unique telephone number. Upon receiving this call, the enhanced telephony service may poll the subscriber's work telephone, home telephone, mobile telephone and/or any other telephone number that is listed in the subscriber's personal profile until the subscriber is located. While the enhanced telephony service is polling the subscriber's various telephone numbers, the caller is put on hold. Typically, at any time while the caller is on hold during this polling period, the caller may opt to be directed to the subscriber's voice mail rather than wait for the enhanced telephony service to locate the subscriber.

In order to provide a valuable service, it is highly desirable that the polling period be minimized. Typically callers will not tolerate being on hold more than about thirty seconds. Therefore, the method used by the enhanced telephony service to locate the subscriber at one of the potential telephone numbers associated with the subscriber must be minimized. To minimize this polling period, several techniques are well known in the art. In a first technique, the subscriber periodically tells the enhanced telephony service the telephone number where he can be reached. A second technique is to have the subscriber provide the enhanced telephony service a schedule of where he can be reached. In a third technique, the subscriber provides the enhanced telephony service with the sequential order that the phone numbers associated with the subscriber should be tried. These techniques all have the disadvantage that they place a substantial burden on the subscriber. To be effective, they require at a minimum, that the subscriber inform the enhanced telephony service of possible schedule variances. Otherwise, the enhanced telephony service will not efficiently locate the subscriber and the polling period will become too long for callers to tolerate. In another well known technique, known as the shotgun or parallel search approach, all the phone numbers associated with the subscriber are called at once by the enhanced telephony service in order to locate the subscriber. The shotgun technique is advantageous because the subscriber does not have to provide the enhanced service provider with schedules or schedule variances. The shotgun technique, however, is disadvantageous because of the potential to disrupt people who share one of the subscriber's telephone numbers, such as a spouse at home or coworkers at work, with a large number of telephone calls. Further, the shotgun technique uses ports in an efficient and wasteful manner. U.S. Pat. No. 5,793,859 uses a history database to avoid the inconvenience of techniques that require the subscriber to specify the telephone number where the subscriber is likely to be reached. The history database is used to calculate a statistical distribution that helps prioritize which telephone numbers in the subscriber's profile are to be polled first. The history database tracks the success the enhanced telephony service has had locating the subscriber at each of the telephone numbers in the subscriber's profile in the past. Typically, the history database is divided into time intervals, such as 7:00 AM to 8:00 AM on Mondays, etc. Thus, one record in the history database may, for example, track how often the enhanced telephony service was able to reach the subscriber at the subscriber's home phone number between 7:00 AM and 8:00 AM. The enhanced telephony service uses the history database entry that corresponds to the time interval in which the enhanced telephony service received a call to prioritize or weight each of the telephone numbers in the subscriber's profile. Telephone numbers that have a higher incidence of success, in terms of being used to successfully reach the subscriber, receive a higher priority or weight in the history database. The enhanced telephony service polls the telephone numbers in subscriber's profile using the highest weighted telephone numbers first.

Although the use of a history database reduces the subscriber's burden of providing information on where the subscriber is located at all times, the history database technique is ineffective at compensating for unexpected variances in the subscriber's schedule. For example, if the subscriber is sick on a particular day or leaves work early, the history database technique will increase the amount of time it takes to locate the subscriber because the home phone number will be one of the last places the enhanced telephony service calls to locate the subscriber.

Each of the techniques used by enhanced telephony services to locate a subscriber has limitations. Further, the value of the enhanced telephony service is highly dependent on providing a minimal polling time. The longer the polling time, the less frequently the enhanced telephony service will be used because callers will attempt to reach the subscriber directly. Accordingly, there is a need in the art for improved methods for minimizing the average polling time required to locate a subscriber of a enhanced telephony service.

SUMMARY OF THE INVENTION

In summary, the present invention is an improved system and method for locating a subscriber to a telephony service at any one of a number of telephone numbers associated with the subscriber. In front-end embodiments of the present invention, a caller wishing to contact the subscriber places an incoming call to the subscriber's unique telephone number and the call is directed by the telephony service. In back-end embodiments of the present invention, the caller places a call to the subscriber's published or "real phone number", and if the number is busy or does not answer, the call is then routed to the telephony service, which then directs the call.

To properly direct an incoming call, the telephony service first attempts to reach the subscriber at the phone number that the telephony service reached the subscriber the last time an incoming call was routed to the subscriber. This last phone number is referred to as the Best Guess Location ("BGL"). If the telephony service is successful at reaching the subscriber at the BGL, the telephony service directs the incoming call to the subscriber at the BGL. Otherwise, the telephony service will use an alternative method to poll the remaining numbers associated with the subscriber. In some embodiments of the present invention, when the telephony service is successful at reaching the subscriber at one of the remaining numbers associated with the subscriber, the successful telephone number is automatically designated as the BGL. However, in a preferred embodiment, the subscriber is given the opportunity to designate the successful telephone number as the new BGL. This opportunity is provided even if the caller has abandoned the call before the subscriber has been connected to the caller.

In a preferred embodiment, when the subscriber receives an incoming call, the subscriber is given the option to transfer the call to one of the other telephone numbers associated with the subscriber or to a temporary ad-hoc telephone number that is not associated with the subscriber. If the transfer is successful, the telephone number the incoming call was transferred to can be designated as the new BGL. The reassignment of the BGL to the transferred telephone number may be limited to a fixed period, such as one hour, after which the system will revert back to the original BGL.

In another preferred embodiment, the telephony service only uses the BGL if one or more specific conditions are satisfied. If these conditions are not satisfied, the telephony service does not automatically try the BGL first. Rather, the telephony service immediately uses the alternate method for polling the subscriber's telephone numbers. The specific conditions used to determine whether the BGL is to be attempted before alternative polling methods are invoked may include a time of day or date restriction, or an elapsed time cutoff. Thus, under a time of day restriction, if the last successful telephone call, which in some embodiments forms the basis for designating the BGL, was made before a predetermined time of day and the incoming call is made after the predetermined time of day, the telephony service uses an alternate method for locating the subscriber rather than first attempting the BGL.

In the present invention, there are several different possible alternate methods for polling the subscriber's numbers if the BGL is not used first or was unsuccessful. In one embodiment, the subscriber specifies the order in which the subscriber's telephone numbers are polled. In another embodiment, a history database is used to compute the likelihood that the subscriber is located at a specified telephone number at a particular time. The enhanced telephony service uses this information to poll the telephone numbers that have the highest likelihood of success.

BRIEF DESCRIPTION OF THE DRAWINGS

Additional objects and features of the invention will be more readily apparent from the following detailed description and appended claims when taken in conjunction with the drawings, in which:

FIGS. 3A, 3B, 3C, 3D and 3E are block diagrams depicting embodiments of subscriber database records.

DESCRIPTION OF THE PREFERRED EMBODIMENTS

Figure 1:
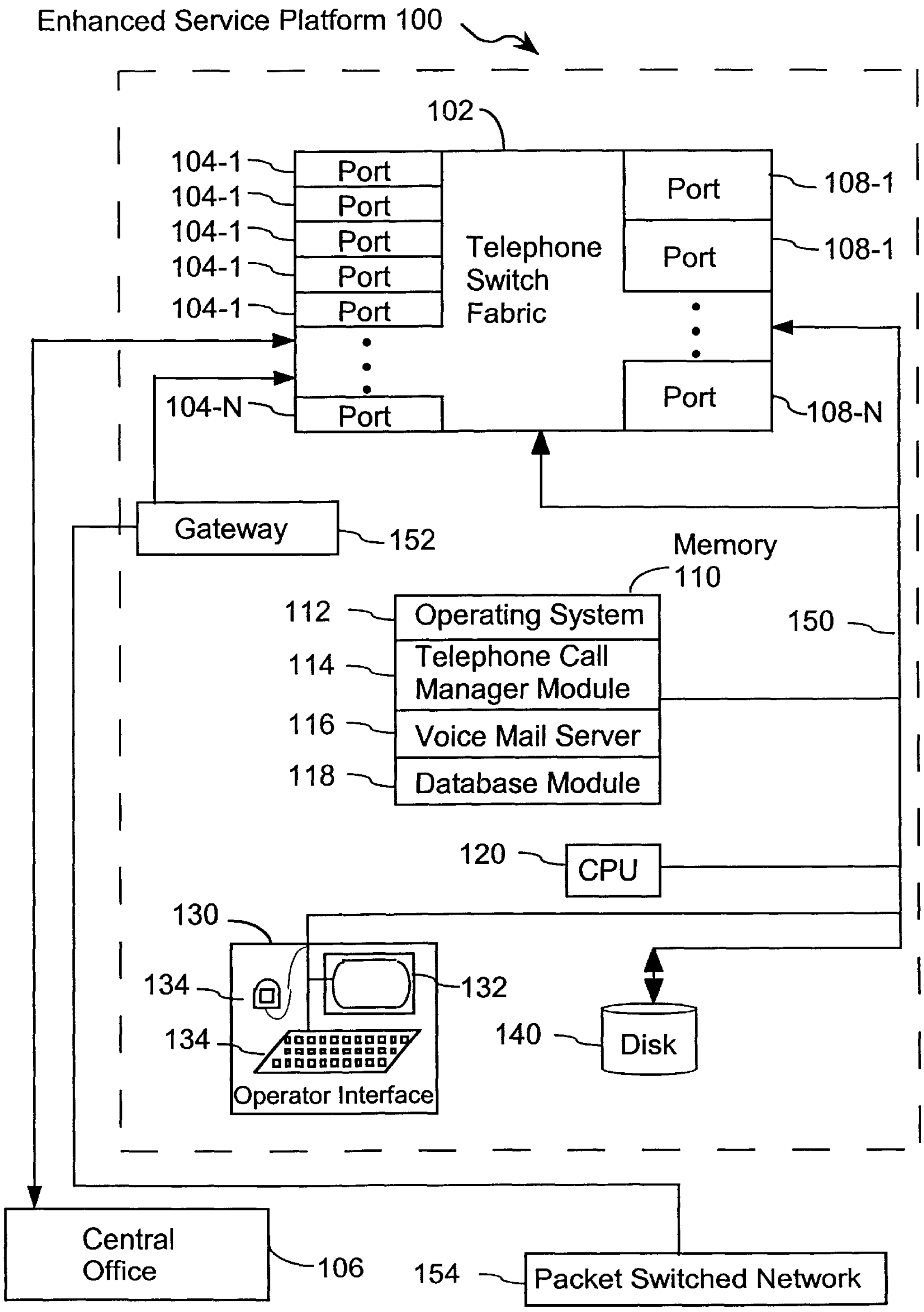
FIG. 1 is a block diagram of a network including an enhanced service platform that embodies the call directing method of the present invention.

Referring to FIG. 1, there is shown an enhanced service platform 100 for storing and retrieving messages. The system preferably includes:

- a switch fabric 102 (optionally implemented as a time division multiplex bus) for directing an inbound telephone call, which includes one or more ports 104 for connecting switch fabric 102 to a central office 106 (i.e., an external switching fabric), and one or more ports 108 for connecting switch fabric 102 to other components of enhanced service platform 100;
- a system memory unit 110, preferably including both high speed random access memory (RAM) and non-volatile memory (e.g., disk storage and/or read-only memory (ROM)), for storing system control programs and data;
- one or more central processing units (cpu) 120;
- a main non-volatile storage unit 140, preferably a hard disk drive, for storing data, including voice mail messages;
- one or more internal buses 150 for interconnecting the aforementioned elements of the system;
- a gateway 152 for connecting enhanced service platform 100 to a packet switched network 154. Gateway 152 may be connected to ports 104 as shown or connected to internal bus 150; and
- an optional operator interface 130 (that is usually located at a remote location and connects to the service platform through a LAN or WAN via TCP/IP rather than as depicted), including a display 132 and one or more input devices 134.

The operation of platform 100 is typically controlled by control programs that are executed by the platform's CPU 120. The system's control programs may be stored in system memory 110. In a typical implementation, the programs stored in the system memory will include:

- an operating system 112 for performing basic system services such as input/output operations, process management, file management, and the like;
- a telephone call manager module 114, for providing telephony services to a subscriber;
- a voice mail server 116, for receiving and forwarding voice messages; and
- a database module 118, for storing subscriber information.

Figure 2A:
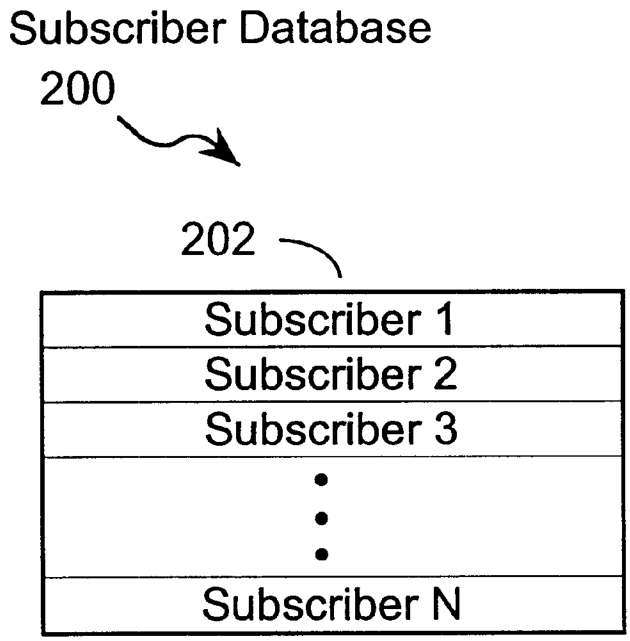
FIGS. 2A and 2B are block diagrams depicting subscriber configuration and global database records.

FIG. 2 is an illustration of various embodiments of database structures maintained by database module 118

Figure 2B:
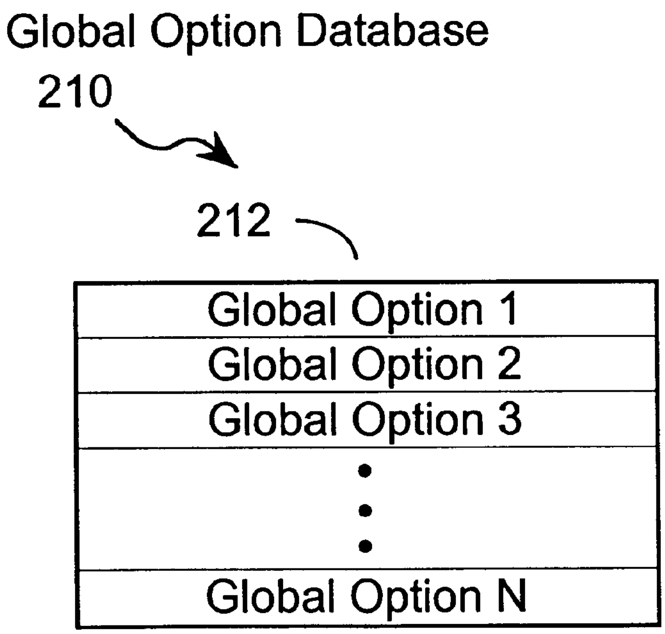

(FIG. 1). In particular, referring to FIG. 2A, a subscriber database 200 maintains a record, or set of records 202 for each subscriber of the enhanced telephony service. As will be described in more detail below, these records are used to customize the operation of the enhanced telephony service for each subscriber. Referring to FIG. 2B, a global option database 210 maintains global options 212 that are available to all subscribers of the enhanced telephony service. Global options 212 will generally include menu options that are provided to the subscriber for updating the subscriber's preferences. Such menu option may include voice messages such as "Enter 1 to change subscriber preferences" and "Enter 0 to edit subscriber telephone numbers."

FIGS. 3A through 3E illustrate various database structures that may be maintained by database module 118 (FIG. 1) for each subscriber of the enhanced telephony service.

Figure 3A:
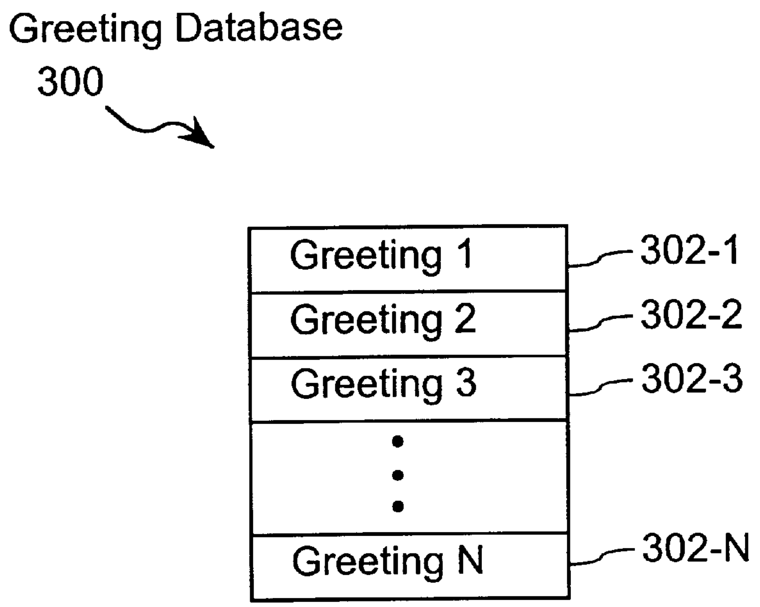

Referring to FIG. 3A, in one embodiment of the present invention, a greeting database 300 is maintained for each subscriber. Database 300 provides the subscriber with the capability of storing highly customized greetings 302. Each greeting 302 communicates a set of options to callers that are telephoning subscribers. In one embodiment, a subscriber may configure his account so that the particular greeting 302, or set of options, that is provided to a caller is a function of the time of day. Thus, for example, greeting 1 may be used between the hours of 8:00 AM and 10:00 AM, weekdays, greeting 2 may be used between the hours of 10:00 AM and 5:00 PM, weekdays, and greeting 3 may be used on weekends. Each greeting provides callers with an appropriate set of options given the time of day. If different greetings 302 are presented to callers based upon variables such as time of day, one of skill in the art will recognize that each configuration 314 (FIG. 3B) will need to include a data structure that stores which greeting 302 is to be played based on day of week, time of day and other calender dependent scheduling considerations like holiday scheduling. In another embodiment, each greeting 302 is used to field a class of telephone numbers in the subscriber's profile. For example, greeting 1 may be used to respond to callers who are registered in the subscriber's profile as a high priority caller. Similarly, greeting 2 may be used to respond to lower priority callers, greeting 3 may be used to respond to callers who have blocked automatic identification of their telephone number, and so on. The greeting 302 that is provided to high priority callers may have more, or extended, options than a greeting 302 that is provided to low priority callers. Such extended options may include the option to allow the caller to leave a voice mail message. Further, the subscriber may reconfigure each greeting 302 as needed.

Other customized greetings 302 may be used based upon the destination of a telephone call. For example, while it is expected that only the subscriber will answer the phone at work, the case may be different for a home number, where it is more likely that someone other than the subscriber, such a member of the subscriber's family, will answer the phone. Therefore, when calling a number, such as the subscriber's home phone number, a greeting 302 may be used to prompt the person answering the call to enter a pass code to prove that they are the subscriber.

Figure 3B:
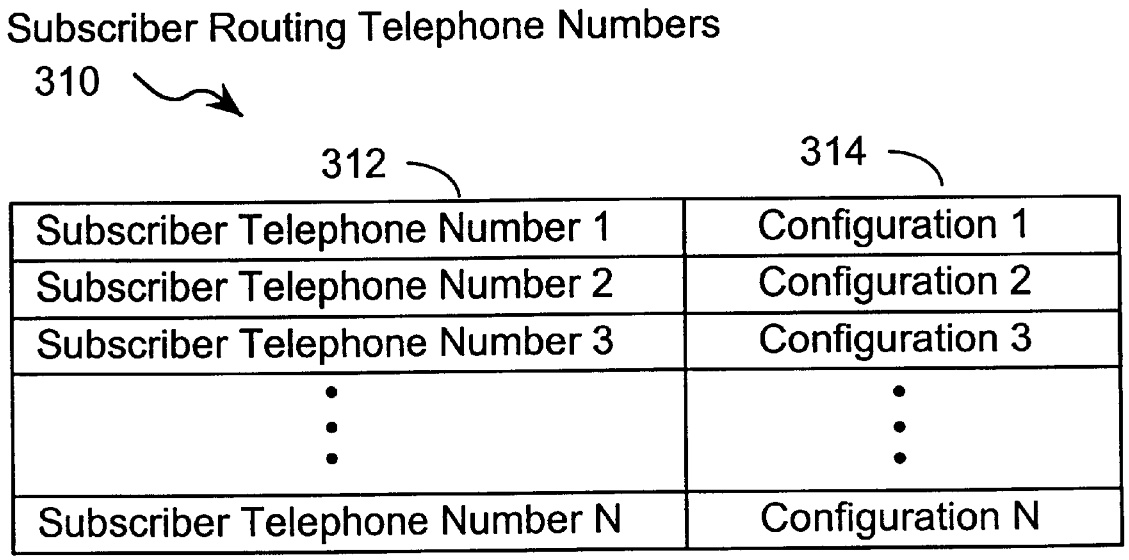

FIG. 3B shows the database structure 310 that is used to store subscriber telephone numbers, according to one embodiment of the invention. Typically, each subscriber to the enhanced telephony service has multiple telephone numbers 312. Further, a configuration 314 is associated with each telephone number 312. The composition of configuration 314 varies depending upon the particular embodiment of the invention. Configuration 314 may include a pointer to a greeting 302. In such a case, the particular greeting 302 that configuration 314 points to will always be used when a call is directed to the subscriber telephone number 312 that corresponds to configuration 314. For example, if configuration 1 (FIG. 3B) points to greeting 3 (FIG. 3A), then greeting 3 will be used when subscriber telephone number 1 is used by the enhanced telephony service to direct an inbound telephone call. Further, configuration 314 may point to a plurality of greetings 302 depending on the time of day or day of the week that the inbound telephone call is received. Thus, for example, a configuration 314 may specify that greeting 1 be used on weekdays and greeting 2 be used on the weekends. Configuration 314 may also include "block out" periods in which the associated telephone number 312 is not to be used by the telephony service to attempt to reach the subscriber.

Configuration 314 may further include a weight field that is used by the telephone call manager module 114 (FIG. 1) to determine the order with which telephone numbers 312 are selected. For example, referring to FIG. 3B, if the weight "7" is stored in configuration 1 and the weight "12" is stored in configuration 2, then the telephone call manager module 114 will assign a higher priority to subscriber telephone number 2 than to subscriber telephone number 1. Because of the higher priority assigned to telephone number 2, it is likely that subscriber telephone number 2 would be used by the telephone call manager module 114 to attempt to reach the subscriber before subscriber telephone number 1 is used. Configuration 314 may also include a "first to be called" field. If the "first to be called" field is set in a particular configuration 314, then the corresponding subscriber telephone number 312 will be used to attempt to reach the subscriber before any other subscriber telephone number 312 is polled. At a maximum, only one configuration 314 may have the "first to be called" field set at any given time. In many instances, none of the configurations 314 will have the "first to be called" field set.

In one embodiment, weights that may be present in configuration 314 could be assigned by the subscriber. In another embodiment, the weights may be assigned based upon a characteristic of the subscriber telephone number 312. For example, the subscriber telephone number 312 that is the subscriber's home telephone number may receive a weight of "10" whereas the subscriber's work telephone numbers may receive a weight of "20".

Referring to FIG. 3C, in yet another embodiment, the weights that may be present in configuration 314 are determined by a history database 320. History database 320 is typically a two dimensional data array. The first dimension represents subscriber telephone numbers 312 whereas the second dimension represents time intervals 324. Each time interval 324 has a corresponding weight set. In turn, each weight in each weight set corresponds to a unique subscriber telephone number 312. The weight set that corresponds to the time interval in which an inbound telephone call is received by enhanced service platform 100 is the weight set that is used by telephone call manager module 114 (FIG. 1) to prioritize subscriber telephone numbers 312. For example, referring to FIG. 3C, if time interval/weight set 1 corresponds to the period 8:00 AM to 12:00 PM, Mondays, and an inbound telephone call is received by enhanced service platform 100 at 8:53 AM on a Monday, then weight set 1 will be used by telephone call manager module 114 to prioritize subscriber telephone numbers 312.

In one embodiment, weights 324 of history database 320 may be fixed by the subscriber and/or a characteristic of the subscriber telephone number (work, mobile, home). In another embodiment, weights 324 may be determined by a scoring function. This scoring function may be the frequency with which completed telephone calls between enhanced service platform 100 and subscriber telephone numbers 312 are made during a particular time interval. Thus, in such an embodiment, weight 1.1 in FIG. 3C could be determined by the number of successfully completed telephone calls between the enhanced service platform 100 and subscriber telephone number 1 during time interval 1. In another embodiment, the scoring function may be the number of successfully completed telephone calls that overlap, to any extent, with a time interval. Thus, in such an embodiment, a single successfully completed telephone call may be credited towards multiple time intervals 324. For example, in an embodiment in which time interval/weight set 1 corresponds to the period 8:00 AM to 12:00 PM, Mondays, and time interval/weight set 2 corresponds to the period 12:00 PM to 4:00 PM, Mondays, if an inbound telephone is successfully directed to telephone number 1 at 11:50 AM, the scoring function would credit the inbound telephone call to weight 1.1. If the call ends at 12:05 PM, the scoring function would also credit the inbound telephone call to weight 1.2. There are various ways in which the inbound call could be credited towards multiple weights. For example, the scoring function may credit weight 1.1 and weight 1.2 by adding a "1" to their previous values. Alternatively, the scoring function may credit weights 1.1 and 1.2 by the fraction of the inbound telephone call that occurred in each of the two time intervals represented by weights 1.1 and 1.2. Thus, in the example, weight 1.1 could receive a credit of ⅔ and weight 1.2 could receive a credit of ⅓ since the telephone call lasted for 15 minutes, ten during time interval 1 and five during time interval 2.

In one embodiment, the scoring function is determined by successfully completed telephone calls that originate from the enhanced service platform 100. In another embodiment, the scoring function is determined by successfully completed telephone calls that originate either from a subscriber telephone number 312 or enhanced service platform 100. Thus, in this second embodiment, if the subscriber calls enhanced service platform 100 to check for messages, the telephone call is counted as a successfully completed telephone call by the scoring function. In yet another embodiment, the scoring function does not consider successfully completed telephone calls that occur prior to a time threshold relative to the current inbound telephone call. Thus, if the time threshold is set to two weeks and an inbound telephone call is received on Apr. 18$^{th}$, 1999, then only successfully completed telephone calls made since Apr. 4$^{th}$, 1999, are considered by the scoring function. The time threshold is preferably set to six weeks or more.

In yet another embodiment, weights 324 are initialized with default values that are provided either by the subscriber or are based upon a characteristic of corresponding telephone number 312. Then, the scoring function is used to adjust the initialized weights 324 over time.

Referring to FIG. 3D, there is shown the structure of caller based instruction set database 340. This database allows users to store an instruction set 344 for the corresponding caller ID 342. Caller IDs 342 are telephone numbers that have special significance to the subscriber. For example, a Caller ID 342 may be a high priority telephone number such as that of the subscriber's children's school that is used to notify the subscriber during emergencies. Thus, instruction set 344 may provide the permission necessary to cause enhanced service platform 100 to override subscriber telephone number 312 block out periods that are specified in the configuration 314 that is associated with the subscriber telephone number 312 (FIG. 3B). Conversely, a Caller ID 342 may be a telephone number from which the subscriber wants to receive no telephone calls. In such a case, instruction set 344 will direct the enhanced service platform 100 to terminate the undesired incoming call before the subscriber is contacted.

Figure 3E:
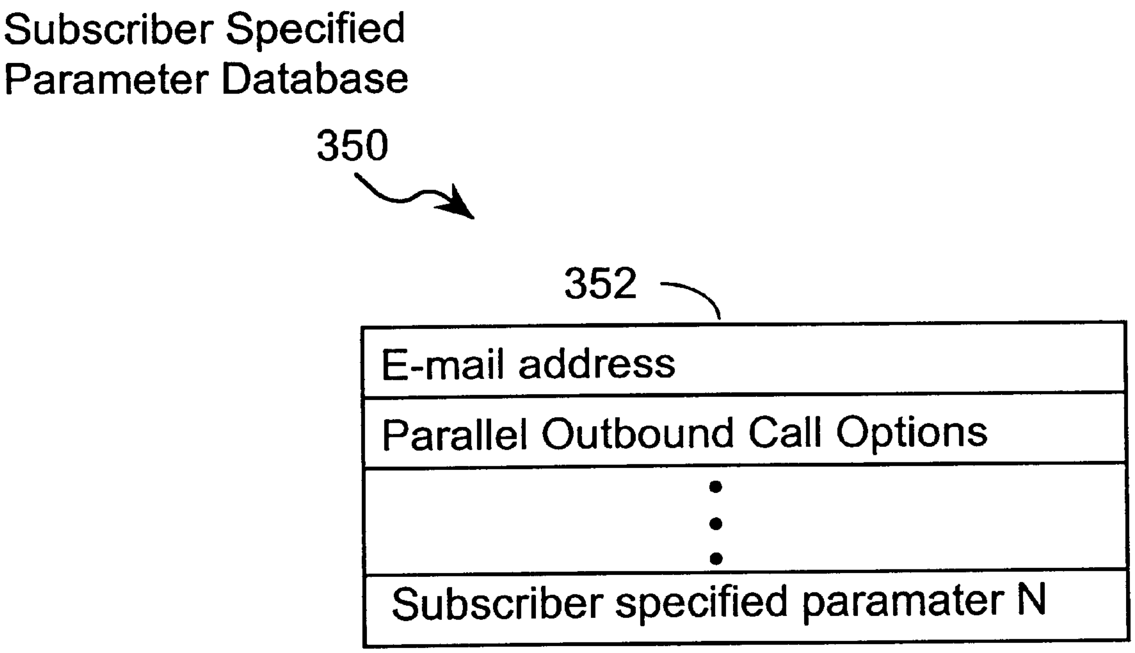

FIG. 3E depicts the structure of subscriber specified parameter database 350. Database 350 stores various parameters that are unique to a particular subscriber. For example, database 350 may include one or more of the subscriber's unique telephone number, E-mail address, billing address, and/or credit card options. The database may also store information about the nature of the service the subscriber has purchased. For example, some embodiments of the present invention may offer different levels of service. One characteristic that may distinguish these various service levels is the maximum number of subscriber telephone numbers 312 that telephone call manager module 114 will simultaneously call in an attempt to find the subscriber when an inbound telephone call is received. Accordingly, the value for the "maximum number of parallel calls" could be stored in subscriber specified parameter database 350.

Directing A Telephone Call to a Subscriber

The operation of enhanced service platform 100 will now be described with reference to FIGS. 4, 5 and 6.

Figure 4:
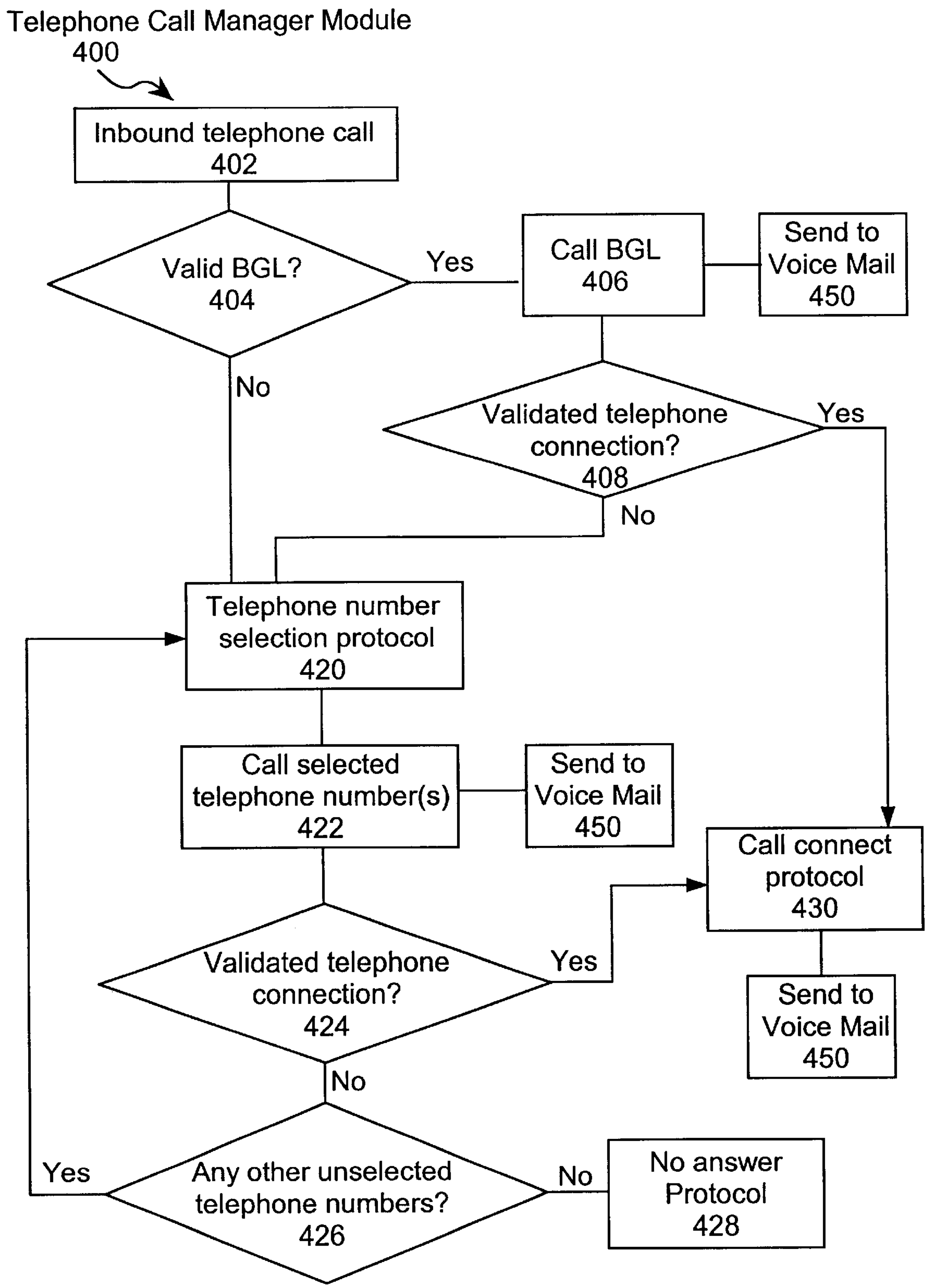
FIG. 4 is a flow diagram of an embodiment of a telephone call manager module for directing inbound telephone calls.

Referring to FIG. 4, the process for directing a call to a subscriber is initiated when the enhanced service platform 100 receives an inbound telephone call 402. In some embodiments, known as "front-end" embodiments, inbound telephone call 402 occurs when a person wishing to call the subscriber dials a unique telephone number that is assigned to the subscriber. In other embodiments, known as "back-end" embodiments, a person wishing to contact the subscriber calls any telephone number that is associated with the subscriber. If the telephone number that the person calls is busy or there is no answer, the telephone call is then directed (forwarded) to the enhanced service platform as inbound telephone call 402.

In response to the inbound telephone call 402, telephone call manager module 114 (FIG. 1) determines whether there is a valid BGL that should be used to locate the subscriber 404. The rules used to determine whether a valid BGL 404 exists vary depending upon the embodiment of the invention. In one embodiment, a valid BGL 404 is the last telephone number 312 (FIG. 3B) to be used to successfully complete a prior telephone call between enhanced service platform 100 and the subscriber. This prior telephone call may have been placed either (i), by the subscriber to the enhanced service provider or (ii), by the enhanced service platform to the subscriber. In a preferred embodiment, if the prior telephone call is in fact placed by the subscriber, then the subscriber must have additionally logged in to the enhanced service platform 100 in order for the prior telephone call to be considered a valid first telephone number 404. The login requirement serves to distinguish calls that are merely placed from a valid subscriber telephone number 312 from calls that are, in fact, made by the subscriber. Preferably, when a subscriber is not found 428, the BGL is reset to "none". Thus, in a subsequent incoming call to the subscriber, step 404 will necessarily return a "No" because the BGL has been set to "none". In such preferred embodiments, when the subscriber is then successfully located at a telephone number (424-Yes), the BGL may again be reset to the successful telephone number.

In some embodiments, if no telephone number 312 was successfully reached the last time enhanced service platform

100 attempted to direct a call to the subscriber, but one of the telephone numbers 312 was “busy”, then the “busy” telephone number may be designated as a valid BGL 404. Alternatively, in some embodiments, the subscriber can designate the subscriber’s BGL by placing a call from the telephone number, which the subscriber would like to designate as the subscriber’s BGL, to a special telephone number associated with enhanced service platform 100. In a preferred alternative embodiment, to save toll charges, the special telephone number does not answer the subscriber’s call. Rather, the special number acts “busy”. Depending on the exact implementation, subscribers wishing to set their BGL are identified either by (i), assigning a unique telephone number to each subscriber that is used to set the BGL (ii), by virtue of the subscriber calling the enhanced service platform 100 from a subscriber telephone number 312, and/or (iii), by logging into the enhanced service platform 100 and designating the BGL in response to a global option 212 (FIG. 2B).

As one skilled in the art will appreciate, in back-end embodiments of the invention, a first number that was dialed by a caller wishing to contact the subscriber will not qualify as a valid BGL 404 because the enhanced service platform 100 would not have received inbound telephone call 402 if the first number had answered. In some embodiments, the valid BGL 404 is cleared at a “time of day”, “date”, or “an amount of time” threshold. If valid BGL 404 is cleared, then valid BGL 404 query will return a “no”. As an illustration, in an embodiment having a “time of day” threshold of 6:00 PM, the valid BGL is cleared if the last successful telephone call was made before 6:00 PM and inbound telephone call 402 is received after 6:00 PM. In an embodiment that includes “an amount of time” threshold of 4 hours, the valid BGL is cleared if the last successful telephone call was completed more than 4 hours before inbound telephone call 402 is received by enhanced service platform 100. In another embodiment, the valid BGL is cleared if, the last time an inbound telephone call 402 was received, telephone call manager module 114 was unable to establish a validated connection with the subscriber. In yet another embodiment, the valid BGL is cleared only if, the last time an inbound telephone call 402 was received, telephone call manager module 114 was unable to establish a validated connection with the subscriber and none of subscriber telephone numbers 312 (FIG. 3B) were busy. One of skill in the art will recognize additional criteria may be used to construct complex rules for determining if there is a valid BGL 404, including embodiments that combine one or more of the embodiments described herein.

If a valid BGL 404 does exist, telephone call manager module 114 will call the BGL 406 and, if the call is answered, validate the telephone connection 408. In one embodiment validation 408 may comprise the entry of a particular password by the person answering call 408. In another embodiment, validation 408 comprises voice recognition of the subscriber by the enhanced service platform when the subscriber answers the phone. In yet another embodiment, validation 408 is satisfied if telephone call 406 is simply answered. In a preferred embodiment, validation 408 comprises acceptance of the telephone call. For example, when the call is answered, the enhanced service platform 100 may say “To accept this call, press “1” or “To accept this call, please enter your pass code”. The form of validation 408 required may be dependent upon a characteristic of the telephone number stored in configuration 314 (FIG. 3B). For example, a subscriber telephone number 312 that is a voice answering machine may not require validation. If validation 408 is successful, call connect protocol 430 is initiated.

If a valid BGL does not exist 404, or the first telephone connection is not validated 408, telephone number selection protocol 420 will select an available subscriber telephone number 312 having the highest weight, according to configurations 314 (FIG. 3B). However, telephone number selection protocol 420 will not select a subscriber telephone number 312 that is considered unavailable. A subscriber telephone number 312 is considered unavailable, for a given inbound telephone call 402, if it has already been used to place a BGL call 406 or has been selected in previous executions of telephone number selection protocol 420. Furthermore, in back-end embodiments, the number used by a caller, in the unsuccessful direct attempt to contact the subscriber, is also considered unavailable.

If the subscriber has purchased a service plan that provides for multiple parallel attempts to reach the subscriber, telephone number selection protocol 420 will select a plurality of the highest weighted subscriber telephone numbers 312 that are considered available. For example, if the subscriber has purchased a service plan that provides for a maximum of three parallel attempts, telephone number selection protocol 420 will select the three highest weighted available telephone numbers 312.

After an execution of telephone number selection protocol 420, a telephone call 422 is placed to each subscriber telephone number 312 selected by telephone number selection protocol 420. If any telephone connection 422 is validated 424, then remaining calls 422 are terminated and call connect protocol 430 is initiated using validated telephone call 424. If no telephone call 422 is validated and there are remaining available telephone numbers 312, then telephone number selection protocol 420 is re-executed. If no telephone call 422 is validated and there are no available telephone numbers 312, no answer protocol 428 is initiated.

In some embodiments, the user who initiated inbound telephone call 402 has the option to direct their call to voice mail 450 by entering a predetermined code or in response to a menu option. Further, in some cases, the user may abandon the incoming call while telephone manager module 400 is attempting to locate the subscriber. The likelihood that the user will abandoned the call increases when the subscriber is not located at the BGL (408-No) and additional telephone numbers associated with the subscriber must be attempted (420, 422). An advantage of a preferred embodiment of the present invention is that if the subscriber does answer at one of the subsequent telephone numbers (424-Yes) and the user has abandoned the incoming call, the subscriber will be provided with an option to change the BGL to the telephone number that the subscriber answered. As an illustration, consider the case in which user A calls subscriber B. First, module 400 attempts the BGL of subscriber B. When B does not answer at the BGL (408-No), other numbers associated with the subscriber B are attempted (420, 422). Although module 400 finds subscriber B at one of the other numbers, user A abandons the call before the two are connected to each other. When this occurs, subscriber B will be notified that user A has hung up and asked whether the number subscriber B was found at should be assigned to the BGL. For example, module 400 may prompt subscriber B with the message “I’m sorry, but your caller is no longer on the line. If you’d like me to try you here first for your next call, press 1. Otherwise just hang up.” If subscriber presses “1”, the successful number that was used to reach subscriber B will be designated as the BGL of subscriber B for the next telephone call.

When the system 100 directs an inbound telephone call to a telephone at which the subscriber has been found, it may do so by either making the connection between the inbound and outbound calls using the internal switch fabric 102 of the enhanced service platform 100 (see FIG. 1). Alternately, the system may send an appropriate command to the telephone company central office switching fabric (106, FIG. 1) to connect the inbound and outbound calls, which releases the internal switch fabric 102 from both calls. This alternate switching method could be implemented, for example, using Two B-Channel Transfer (TBCT) ISDN PRI, or the Release Link Trunk (RLT) or Release to Pivot (RTP) features of SS7.

Figure 5:
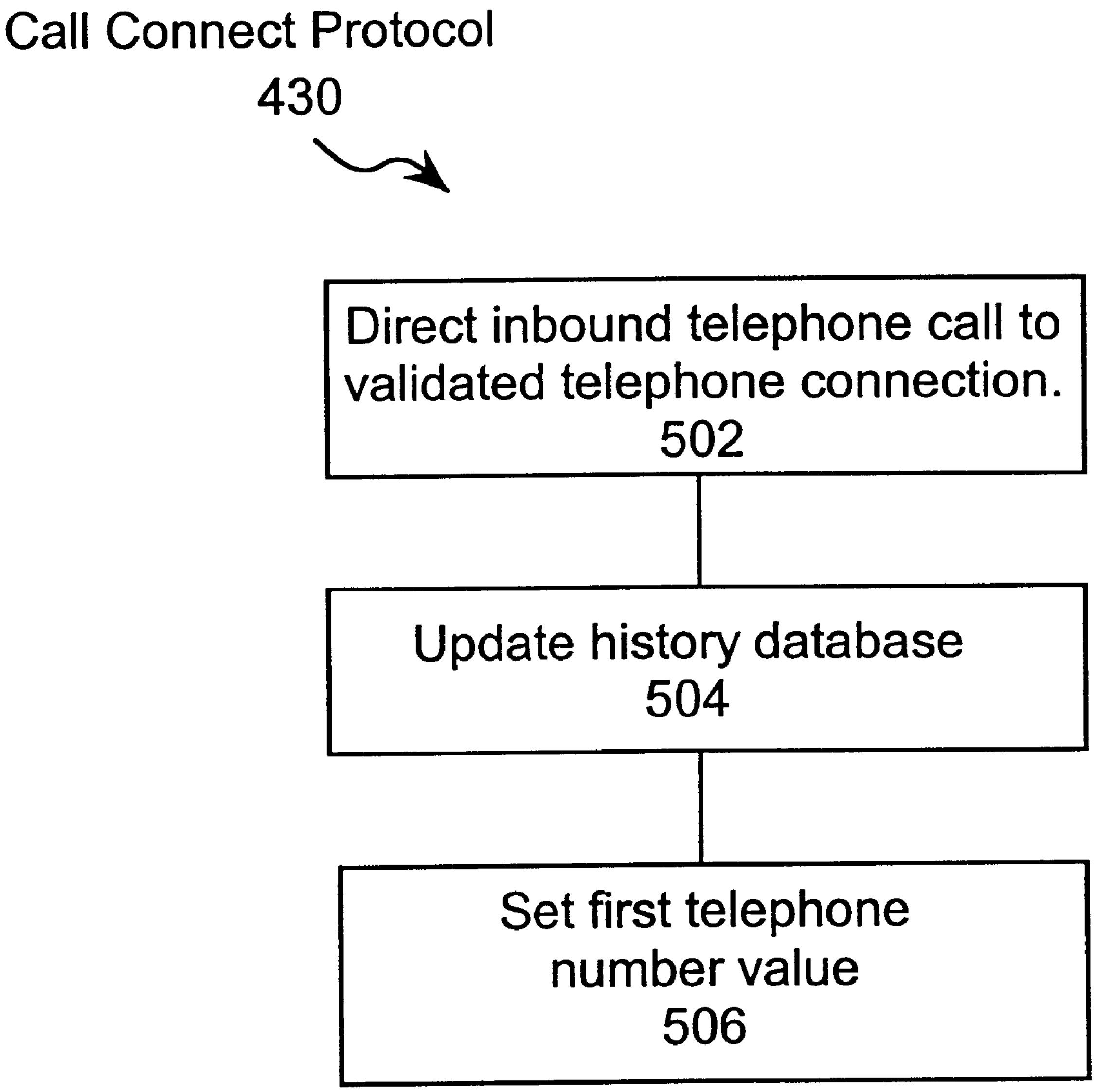
FIG. 5 is a flow diagram of a procedure executed by a telephone call manager module to connect an inbound telephone call with a validated user subscriber number.

Referring to FIG. 5, in the first step of call connect protocol 430, telephone call manager module 114 (FIG. 1) directs inbound telephone call 402 to the validated telephone connection (502). Second, in embodiments having a history database 320, database 320 is updated to reflect the successful telephone connection (504). Finally, the "first to be called" field of the configuration 314 that corresponds to the subscriber telephone number 312 used to make validated telephone connection 408 or 424 is set (506).

In some embodiments of the present invention, the subscriber may choose to transfer the incoming call after the incoming call has been directed to a validated telephone connection 502. Such an option is useful, for example, if the subscriber is using a cell phone and the batteries are running low. Using such an embodiment, the subscriber may transfer the call to a pay phone in the vicinity. In another scenario, the subscriber may have received the incoming call at a fixed land line such as a home phone number or a work phone. If the subscriber wishes to leave the home or office but not terminate the call, the subscriber may simply transfer the call to a mobile phone. In a typical embodiment that includes such a feature telephone call manager module 114 provides a "Park and Transfer" option that allows the subscriber to press an attention sequence to obtain a system prompt. At the prompt, the subscriber enters a telephone number ("designated number") that the incoming call is to be routed to. The designated number may be a subscriber telephone number 312 or a temporary ad-hoc telephone number such as a pay phone at an airport. The temporary ad-hoc telephone number is normally not assigned as the BGL, even when a successful connection is made, because it is assumed that such numbers are only for transient use. However, in some embodiment, the subscriber may be given the option of designating the ad-hoc number as the BGL when a successful connection is made to the designated number. For example, the subscriber may exercise this option by entering an asterisk after the ad-hoc telephone number. Assignment of the designated number as the BGL of the subscriber may be subject to duration restrictions, such as a fixed period of time, time of day, or the date restrictions described in other embodiments of the present invention. It will be appreciated that the temporary ad-hoc telephone number that is not in list 310 (FIG. 3) may be designated by the subscriber. In such cases, the ad-hoc telephone number could, for example, be temporarily added to list 310 or serve as a replacement for the least used telephone number in list 310.

Figure 6A:
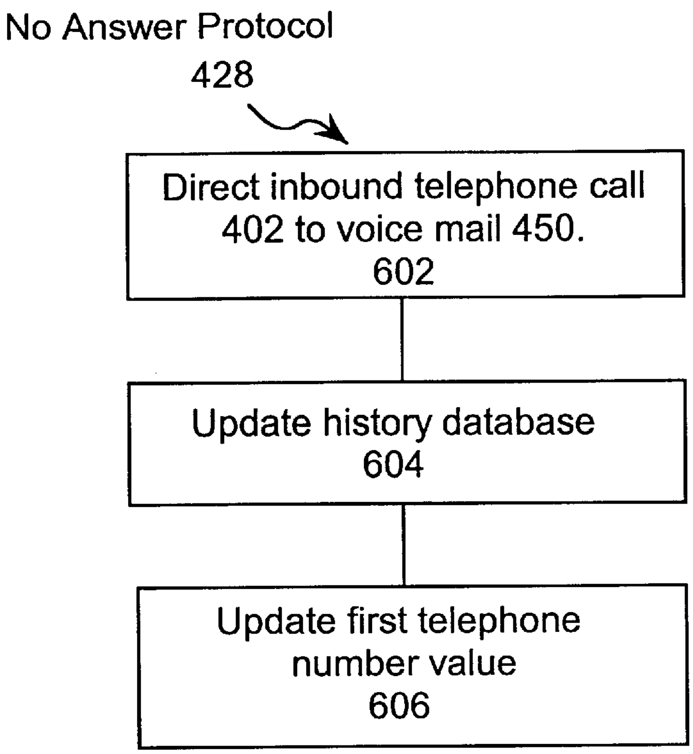
FIGS. 6A and 6B depict flow diagrams of procedures executed by a telephone call manager, module when no user subscriber telephone number is answered.
Figure 6B:
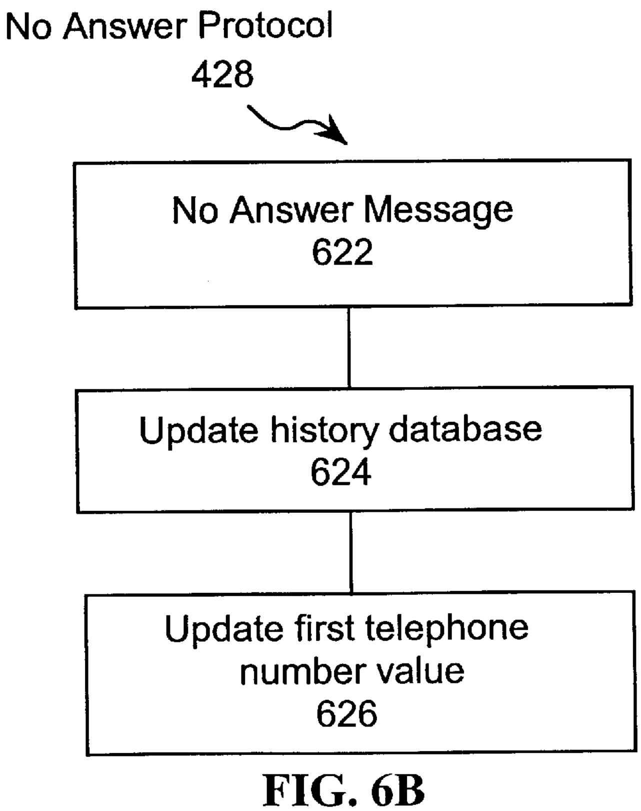

FIGS. 6A and 6B present two alternative embodiments of no answer protocol 428. In FIG. 6A inbound telephone call 402 is directed to the subscriber's voice mail 450 (602). If a history database 320 is maintained, the failure to connect to any subscriber telephone number other than voice mail may be recorded in the database 320 (604). Additionally, in some embodiments, the "first to be called" field in configuration 314 may be cleared. In other embodiments, the "first to be called" field of the configuration corresponding to the subscriber's voice mail may be set. However, in a preferred embodiment, failure to connect to any subscriber telephone number other than voice mail does not affect the"first to be called" field of configurations 314.

FIG. 6B shows an alternative no answer protocol 428 in which a "No Answer Message" 622 is recited to the caller rather than directing inbound telephone call 402 to voice mail. If a history database 320 is maintained, the failure to connect to any subscriber telephone number may be recorded 624. Additionally, in some embodiments, the "first to be called" field in configuration 314 may be cleared.

Alternate Embodiments

The present invention is also applicable to other types of real time communication systems, such as voice over Internet type "telephone" connections where the subscriber is assigned an IP address instead of a telephone number. The present invention can also be applied to other types of real time communication systems, such as video/audio communication systems using Internet or other data network connections. In these systems, each subscriber would have a main IP address that is directed to a call/connection management system that then redirects each inbound connection request to one of a list of IP addresses associated with the subscriber, using the same subscriber location search techniques as described above.

The present invention can be implemented as a computer program product that includes a computer program mechanism embedded in a computer readable storage medium. For instance, the computer program product could contain the program modules shown in FIGS. 1–6. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A system for directing an inbound telephone call from a caller, which has been made to the system, to a subscriber, comprising:

- at least one port for coupling the system to a communications network from which the inbound telephone call is received and to which outbound telephone calls are directed;
- a switch fabric for coupling said inbound telephone call with a selected one of the outbound calls;
- a memory for storing one or more control programs and data associated with one or more system users;
- a central processing unit coupled to the memory and the switch fabric; and
- nonvolatile internal data storage for storing phone messages and user data; wherein:
  - said one or more control programs directs said system to (1) use a first protocol when a protocol selection condition is satisfied; and (2) use a second protocol to direct said inbound telephone call when the protocol selection condition is not satisfied or when said first protocol is not successful; and (a) said first protocol comprises:

(i) selecting a first telephone number, said first telephone number is determined by a most recent telephone number, in a predetermined set of telephone numbers designated by the subscriber, used in a prior telephone call between the subscriber and said system;

(ii) placing a first outbound telephone call to said first telephone number; and (iii) determining success of said outbound telephone call according to a predetermined success criterion;

said first protocol is not successful if said first outbound telephone call is not successful; and (b) said second protocol comprises:

(i) selecting at least one unselected telephone number from said predetermined set of telephone numbers designated by the subscriber according to a selection criterion;

(ii) placing at least one outbound telephone call to the at least one telephone number selected in (b)(i); and (iii) repeating (b)(i) and (b)(ii) until a first occurrence of either a successful telephone call according to the predetermined success criterion or there are no unselected telephone numbers remaining in the predetermined set of telephone numbers designated by the subscriber;

wherein, in said first protocol, said most recent telephone number is selected from the group consisting of a telephone number to which the system successfully directed a prior successful telephone call; a telephone number to which the subscriber transferred a prior successful telephone call; and a telephone number, in said predetermined set of telephone numbers designated by the subscriber, to which an outbound call was placed and that was answered by said subscriber and wherein said caller abandoned said inbound call before said outbound call and said inbound call were connected.

2. The system of claim 1, wherein the first protocol is always used.

3. The system of claim 1, wherein the protocol selection condition is determined by one or more criteria selected from the group consisting of:

(a) whether said prior telephone call is made on a date prior to a date said inbound call is made;

(b) whether said prior telephone call is made before a time of day threshold and said incoming call is made after said time of day threshold;

(c) whether an amount of time threshold has elapsed between a time when said prior telephone call was made and a time when said inbound telephone call was made; and (d) whether, at a last time the system attempted to direct an inbound telephone call to the subscriber, the system was unable to reach the subscriber at any number in the predetermined set of telephone numbers designated by the subscriber.

4. The system of claim 1, wherein the protocol selection condition is satisfied if, at a last time the system attempted to direct an outbound telephone call to the subscriber, the system was unable to reach the subscriber, but at least one telephone number in the predetermined set of telephone numbers designated by the subscriber was busy when said system placed an outbound telephone call in (a)(ii) or (b)(ii).

5. The system of claim 1, wherein said most recent telephone number is a most recently used telephone number, in the predetermined set of telephone numbers designated by the subscriber, used in a successfully completed telephone call that was placed either by the subscriber to the system, or by the system to the subscriber.

6. The system of claim 1, wherein the first telephone number is a number that was busy a last time the system attempted to telephone the number and the system was not successful in directing the prior telephone call to any number in the predetermined set of telephone numbers designated by the subscriber.

7. The system of claim 1, wherein the system is further configured to rank each telephone number in the predetermined set of telephone numbers designated by the subscriber, and the selection criteria of (b)(i) comprises choosing one or more telephone numbers having the highest rank, in the predetermined set of telephone numbers designated by the subscriber, that have not previously been selected in (a)(i) or (b)(i).

8. The system of claim 1, wherein the system is further configured to present a menu of options if an outbound call is answered and said predetermined success criterion is determined by a response to the menu of options.

9. The system of claim 8, wherein the menu is customizable and determined by a characteristic of a telephone number used by the system in placing an outbound telephone call.

10. The system of claim 1, wherein, for each time interval in a set of time intervals, a set of weights is associated with the subscriber;

each weight in each said set of weights corresponds to a telephone number in said predetermined set of telephone numbers designated by the subscriber;

the predetermined set of telephone numbers designated by the subscriber is ranked by the set of weights corresponding to a time interval in the set of time intervals in which the inbound telephone call is received; and the selection criteria in (b)(i) comprises selecting one or more of the highest ranked telephone numbers in the predetermined set of telephone numbers designated by the subscriber that have not been previously selected in (a)(i) or (b)(i).

11. The system of claim 10, wherein each weight in each set of weights is independently assigned an initial value.

12. The system of claim 10, wherein each weight in each said set of weights is determined by a scoring function.

13. The system of claim 12, wherein said scoring function is a function of a number of successfully completed telephone calls between the system and said telephone number associated with said weight during the time interval associated with said weight.

14. The system of claim 12, wherein said scoring function is a number of successfully completed telephone calls between the system and said telephone number associated with said weight that overlap with the time interval associated with said weight.

15. The system of claim 12, wherein only telephone calls made within a cutoff threshold amount of time are used by said scoring function.

16. A method for directing an inbound telephone call from a caller, which has been made to a system, to a subscriber, the method comprising the steps of:

(1) using a first protocol to direct said inbound telephone call when a protocol selection condition is satisfied; and (2) using a second protocol to direct said inbound telephone call when the protocol selection condition is not satisfied or when said first protocol is not successful in directing said inbound telephone call; wherein:

(a) said first protocol comprises:

(i) selecting a first telephone number, said first telephone number is determined by a most recent telephone number, in a predetermined set of telephone numbers designated by the subscriber, used in a prior telephone call between the subscriber and said system;

(ii) placing a first outbound telephone call to said first telephone number; and (iii) determining success of said outbound telephone call according to a predetermined success criterion;

said first protocol is not successful in directing said inbound telephone call if said first outbound telephone is not successful; and (b) said second protocol comprises:

(i) selecting at least one unselected telephone number from said predetermined set of telephone numbers designated by the subscriber according to a selection criterion;

(ii) placing at least one outbound telephone call using the at least one telephone number selected in (b)(i); and (iii) repeating (b)(i) and (b)(ii) until a first occurrence of either a successful telephone call according to said predetermined success criterion or there are no unselected telephone numbers remaining in said predetermined set of telephone numbers designated by the subscriber;

wherein, in said first protocol, said most recent telephone number is selected from the group consisting of a telephone number to which the system successfully directed a prior successful telephone call; a telephone number to which the subscriber transferred a prior successful telephone call; and a telephone number, in said predetermined set of telephone numbers designated by the subscriber, to which an outbound call was placed and that was answered by said subscriber and wherein said caller abandoned said inbound call before said outbound call and said inbound call were connected.

17. The method of claim 16, wherein the first protocol is always used.

18. The method of claim 16, wherein the protocol selection condition is determined by one or more criteria selected from the group consisting of:

(a) whether said prior telephone call is made on a date prior to a date said inbound call is made;

(b) whether said prior telephone call is made before a time of day threshold and said incoming call is made after said time of day threshold;

(c) whether an amount of time threshold has elapsed between a time when said prior telephone call was made and a time when said inbound telephone call was made; and (d) whether, at a last time the system attempted to direct an inbound telephone call to the subscriber, the system was unable to reach the subscriber at any number in said predetermined set of telephone numbers designated by the subscriber.

19. The method of claim 16, wherein the protocol selection condition is satisfied if, at a last time the system attempted to direct an outbound telephone call to the subscriber, the system was unable to reach the subscriber, but at least one telephone number in the predetermined set of telephone numbers designated by the subscriber was busy when said system placed an outbound telephone call in (a)(ii) or (b)(ii).

20. The method of claim 16, wherein said most recent telephone number is a most recently used telephone number, in the predetermined set of telephone numbers designated by the subscriber, used in a successfully completed telephone call that was placed either by the subscriber to the system, or by the system to the subscriber.

21. The method of claim 16, wherein said first telephone number is a number that was busy a last time the system attempted to telephone said number and the system was not successful in directing said prior telephone call to any number in the predetermined set of telephone numbers designated by the subscriber.

22. The method of claim 16, wherein the system is further configured to rank each telephone number in said predetermined set of telephone numbers designated by the subscriber, and said selection criteria of (b)(i) comprises choosing one or more telephone numbers having the highest rank, in said predetermined set of telephone numbers designated by the subscriber, that have not previously been selected in (a)(i) or (b)(i).

23. The method of claim 16, wherein the system is further configured to present a menu of options if an outbound call is answered and said predetermined success criterion is determined by a response to the menu of options.

24. The method of claim 23, wherein said menu of options is customizable and determined by a characteristic of a telephone number used by the system in placing an outbound telephone call.

25. The method of claim 16, wherein, for each time interval in a set of time intervals, a set of weights is associated with the subscriber;

each weight in each said set of weights corresponds to a telephone number in said predetermined set of telephone numbers designated by the subscriber;

the predetermined set of telephone numbers designated by the subscriber is ranked by the set of weights corresponding to a time interval in the set of time intervals in which the inbound telephone call is received; and the selection criteria in (b)(i) comprises selecting one or more of the highest ranked telephone numbers in the predetermined set of telephone numbers designated by the subscriber that have not been previously selected in (a)(i) or (b)(i).

26. The method of claim 25, wherein each weight in each set of weights is independently assigned an initial value.

27. The method of claim 25, wherein each weight in each said set of weights is determined by a scoring function.

28. The method of claim 27, wherein said scoring function is a function of a number of successfully completed telephone calls between the system and said telephone number associated with said weight during the time interval associated with said weight.

29. The method of claim 27, wherein said scoring function is a number of successfully completed telephone calls between the system and said telephone number associated with said weight that overlap with the time interval associated with said weight.

30. The method of claim 27, wherein only telephone calls made within a cutoff threshold amount of time are used by said scoring function.

31. A computer program product for use in conjunction with a computer controlled service platform, the computer program product comprising a computer readable storage medium and a computer program mechanism embedded therein, the computer program mechanism comprising a telephone call manager configured to direct an inbound telephone call from a caller, which has been made to a computer controlled service platform, to a subscriber (1) using a first protocol when a protocol selection condition is satisfied, and (2) using a second protocol to direct said inbound telephone call when the protocol selection condition is not satisfied or when said first protocol is not successful, wherein:

(a) said first protocol comprises:
   (i) selecting a first telephone number, said first telephone number is determined by a most recent telephone number, in a predetermined set of telephone numbers designated by the subscriber, used in a prior telephone call between the subscriber and the service platform;
   (ii) placing a first outbound telephone call to said first telephone number; and
   (iii) determining success of said outbound telephone call according to a predetermined success criterion; said first protocol is unsuccessful in directing said inbound telephone call if said first outbound telephone is unsuccessful; and
(b) said second protocol comprises:
   (i) selecting at least one unselected telephone number from said predetermined set of telephone numbers designated by the subscriber according to a selection criterion;
   (ii) placing at least one outbound telephone call from the service platform by using the at least one telephone number selected in (b)(i); and
   (iii) repeating (b)(i) and (b)(ii) until a first occurrence of either a successful telephone call according to said predetermined success criterion or there are no unselected telephone numbers remaining in said predetermined set of telephone numbers designated by the subscriber;

wherein, in said first protocol, said most recent telephone number is selected from the group consisting of a telephone number to which the system successfully directed a prior successful telephone call; a telephone number to which the subscriber transferred a prior successful telephone call; and a telephone number, in said predetermined set of telephone numbers designated by the subscriber, to which an outbound call was placed and that was answered by said subscriber and wherein said caller abandoned said inbound call before said outbound call and said inbound call were connected.

32. The computer program product of claim 31, wherein the first protocol is always used.

33. The computer program product of claim 31, wherein the protocol selection condition is determined by one or more criteria selected from the group consisting of:

(a) whether said prior telephone call is made on a date prior to a date said inbound call is made;
(b) whether said prior telephone call is made before a time of day threshold and said incoming call is made after said time of day threshold;
(c) whether an amount of time threshold has elapsed between a time when said prior telephone call was made and a time when said inbound telephone call was made; and
(d) whether, at a last time the service platform attempted to direct an inbound telephone call to the subscriber, the service platform was unable to reach the subscriber at any number in the predetermined set of telephone numbers designated by the subscriber.

34. The computer program product of claim 31, wherein the protocol selection condition is satisfied if, at a last time the service platform attempted to direct an outbound telephone call to the subscriber, the service platform was unable to reach the subscriber, but at least one telephone number in the predetermined set of telephone numbers designated by the subscriber was busy when the service platform placed an outbound telephone call in (a)(ii) or (b)(ii).

35. The computer program product of claim 31, wherein said most recent telephone number is a most recently used telephone number, in the predetermined set of telephone numbers designated by the subscriber, used in a successfully completed telephone call that was placed either by the subscriber to the service platform, or by the service platform to the subscriber.

36. The computer program product of claim 31, wherein said first telephone number is a number that was busy a last time the service platform attempted to telephone said number and the service platform was not successful in directing said prior telephone call to any number in the predetermined set of telephone numbers designated by the subscriber.

37. The computer program product of claim 31, wherein the service platform is further configured to rank each telephone number in said predetermined set of telephone numbers designated by the subscriber, and said selection criteria of (b)(i) comprises choosing one or more telephone numbers having the highest rank, in said predetermined set of telephone numbers designated by the subscriber, that have not previously been selected in (a)(i) or (b)(i).

38. The computer program product of claim 31, wherein a menu of options is presented if an outbound call is answered, and said predetermined success criterion is determined by a response to the menu of options.

39. The computer program product of claim 38, wherein the menu of options is customizable and determined by a characteristic of a telephone number used by the service platform in placing an outbound telephone call.

40. The computer program product of claim 31, wherein, for each time interval in a set of time intervals, a set of weights is associated with the subscriber;

each weight in each said set of weights corresponds to a telephone number in said predetermined set of telephone numbers designated by the subscriber;
the predetermined set of telephone numbers designated by the subscriber is ranked by the set of weights corresponding to a time interval in the set of time intervals in which the inbound telephone call is received; and
the selection criteria in (b)(i) comprises selecting one or more of the highest ranked telephone numbers in the predetermined set of telephone numbers designated by the subscriber that have not been previously selected in (a)(i) or (b)(i).

41. The computer program product of claim 40, wherein each weight in each set of weights is independently assigned an initial value.

42. The computer program product of claim 40, wherein each weight in each said set of weights is determined by a scoring function.

43. The computer program product of claim 42, wherein said scoring function is a function of a number of successfully completed telephone calls between the service platform and said telephone number associated with said weight during the time interval associated with said weight.

44. The computer program product of claim 42, wherein said scoring function is a number of successfully completed telephone calls between the service platform and said telephone number associated with said weight that overlap with the time interval associated with said weight.

45. The computer program product of claim 42, wherein only telephone calls made within a cutoff threshold amount of time are used by said scoring function.

* * * * *